United States Patent
Kitamura

(10) Patent No.: US 8,024,550 B2
(45) Date of Patent: Sep. 20, 2011

(54) SIMD PROCESSOR WITH EACH PROCESSING ELEMENT RECEIVING BUFFERED CONTROL SIGNAL FROM CLOCKED REGISTER POSITIONED IN THE MIDDLE OF THE GROUP

(75) Inventor: Hidehito Kitamura, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 190 days.

(21) Appl. No.: 12/356,676

(22) Filed: Jan. 21, 2009

(65) Prior Publication Data

US 2009/0187738 A1    Jul. 23, 2009

(51) Int. Cl.
*G06F 15/80* (2006.01)

(52) U.S. Cl. .......................................... 712/22; 713/400

(58) Field of Classification Search .................. None
See application file for complete search history.

(56) References Cited

U.S. PATENT DOCUMENTS

| | | | | |
|---|---|---|---|---|
| 5,134,616 A * | 7/1992 | Barth et al. | ................... | 714/711 |
| 5,210,836 A * | 5/1993 | Childers et al. | ................ | 712/241 |
| 5,604,710 A * | 2/1997 | Tomishima et al. | ..... | 365/230.03 |
| 6,748,514 B2 * | 6/2004 | Yoshioka | ........................ | 712/13 |

FOREIGN PATENT DOCUMENTS

| | | |
|---|---|---|
| JP | 8-212169 | 8/1996 |
| JP | 8-297652 | 11/1996 |
| JP | 2001-229133 | 8/2001 |
| JP | 2007-18536 | 1/2007 |
| JP | 2007-73010 | 3/2007 |
| JP | 2008-71130 | 3/2008 |

* cited by examiner

*Primary Examiner* — Kenneth S Kim
(74) *Attorney, Agent, or Firm* — Cooper & Dunham LLP

(57) ABSTRACT

Disclosed is an SIMD-type microprocessor comprising a processor element group, plural processor elements with an operation part and a register file being arranged therein and a processor element control signal generator configured to output a processor element control signal controlling an operation of the processor element, wherein a feed part configured to feed a processor element control signal output from the processor element control signal generator to the processor element is provided at a center of the processor element group.

10 Claims, 8 Drawing Sheets

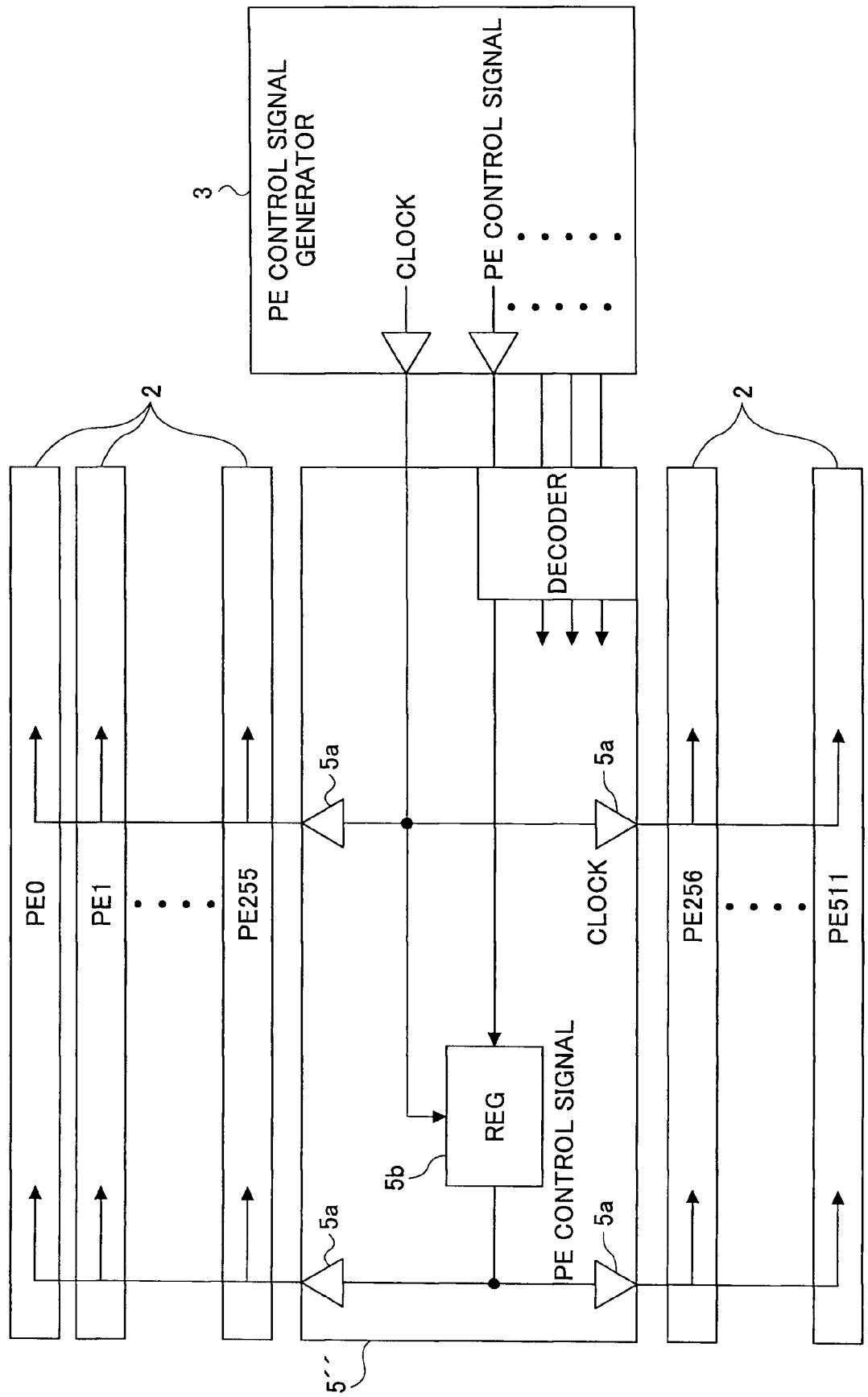

SIMD PROCESSOR WITH EACH PROCESSING ELEMENT RECEIVING BUFFERED CONTROL SIGNAL FROM CLOCKED REGISTER POSITIONED IN THE MIDDLE OF THE GROUP

BACKGROUND

1. Technical Field

This disclosure relates to an SIMD-type microprocessor, a method of processing data, an image data processing system, and a method of processing image data.

2. Description of the Related Art

Recently, improvement of image quality, such as increase of the number of picture elements or impartation of a coloring function is intended in an image processing device such as a digital copying machine or a facsimile apparatus. Then, the number of data that should be processed increases with the improvement of image quality.

Meanwhile, in regard to data processing in an image processing device such as a copying machine, identical processing operations are frequently applied to all of the picture elements. Therefore, an SIMD-type microprocessor is frequently used in which identical processing operations are simultaneously applied to plural data by one command.

FIG. 1 illustrates an SIMD-type microprocessor according to a related art. An SIMD-type microprocessor 100 illustrated in FIG. 1 is composed of a global processor 101, a processor element group 102, and an external input/output 103, wherein predetermined processing operations are applied to image data read from an image memory 104 connected to the SIMD microprocessor 100.

The global processor 101 is a so-called SISD (Single Instruction-stream, Single Data-stream)-type processor which includes a program RAM and a data RAM, interprets a program, and generates various kinds of control signals. The control signals are also fed to register files or an operation array of the processor element group 102, as described below, as well as included blocks. Furthermore, the GP (global processor) conducts various kinds of processing operations and a program control operation using an included generalized register, ALU (arithmetic and logic unit) and the like at the time of executing a command.

In the processor element group 102, plural register files 102a are arranged linearly and plural operation parts 102b are also arranged linearly. On the register files 102a, data to be proceeded by processor elements are held. The control of data reading from/writing into the register files 102a is conducted through controlling of the global processor 101. The data read by controlling the global processor 101 are sent to the operation parts 102b, subjected to processing operations on the operation parts 102b, and subsequently written into the register files 102a. Furthermore, the register files 102a are accessible from the outside of the SIMD-type microprocessor 100 and reading/writing of a specified register is/are conducted from the outside besides the control of the global processor 101. On the operation parts 102b, processing operations are conducted according to a PE (processor element) command. All of the controls of the processing operations according to the PE command are conducted through the global processor 101.

On the external input/output 103, original image data to be processed are read from the image memory 104 and written into the register files 102a of the processor element group 102 or processed image data are read from the register files 102a and written into the read image memory 104.

On the image memory 104, original image data to be processed are stored and processed image data are also stored.

When the number of PEs (the number of the register files 102a and operation parts 102b) is increased in order to improve the throughput of the SIMD-type microprocessor 100 as described above, the length of a control signal line extending from a driving circuit of a PE control signal generator included in the global processor or the like to the terminal of the processor element group 102 (signal line for conducting the control of processing operations according to a PE command) becomes very long.

For example, as described with reference to FIG. 2, the difference between the delay times of a PED arranged near the global processor 101 in the processor element group 102 and a PEn arranged at the end terminal (the most remote one) is large due to the difference between the lengths of wires of the control signal lines and therefore it may be difficult to increase the operation frequency relating to the throughput.

Against such a problem, for example, a method as disclosed in Japanese Patent Application Publication H08-212169 has been suggested. Japanese Patent Application Publication H08-212169 discloses an array processor in which registers between adjacent n processor elements are grouped and a common bus is set to provide each group with one control signal line.

In the method as disclosed in Japanese Patent Application Publication No. H08-212169, however, there is a problem that it may be difficult to connect the registers between the adjacent processor elements by means of a read bus and write bus so as to conduct, for example, a process for shifting plural processor elements, rewriting the data of a specified processor element, or the like. Furthermore, the wiring delay between the control signals for a processor element near a command sequence control part and an end terminal processor element has not been taken into consideration in the method as disclosed in Japanese Patent Application Publication No. H08-212169. Therefore, it has been difficult to increase the operation frequency relating to the throughput.

BRIEF SUMMARY

According to an aspect of this disclosure, there is provided an SIMD-type microprocessor comprising a processor element group, plural processor elements with an operation part and a register file being arranged therein and a processor element control signal generator configured to output a processor element control signal controlling an operation of the processor element, wherein a feed part configured to feed a processor element control signal output from the processor element control signal generator to the processor element is provided at a center of the processor element group.

According to another aspect, there is provided a method of processing data, comprising a step of processing data by using the SIMD-type microprocessor as described above.

According to another aspect, there is an image data processing system, comprising the SIMD-type microprocessor as described above and an image memory connected thereto.

According to another aspect, there is provided a method of processing image data, comprising a step of reading image data from an image memory and a step of processing the image data by using the SIMD-type microprocessor as described above.

BRIEF DESCRIPTION OF THE DRAWINGS

FIG. 8 is a block diagram of an SIMD-type microprocessor according to a fifth specific example of the present invention.

DETAILED DESCRIPTION OF THE PREFERRED EMBODIMENTS

Figure 1:
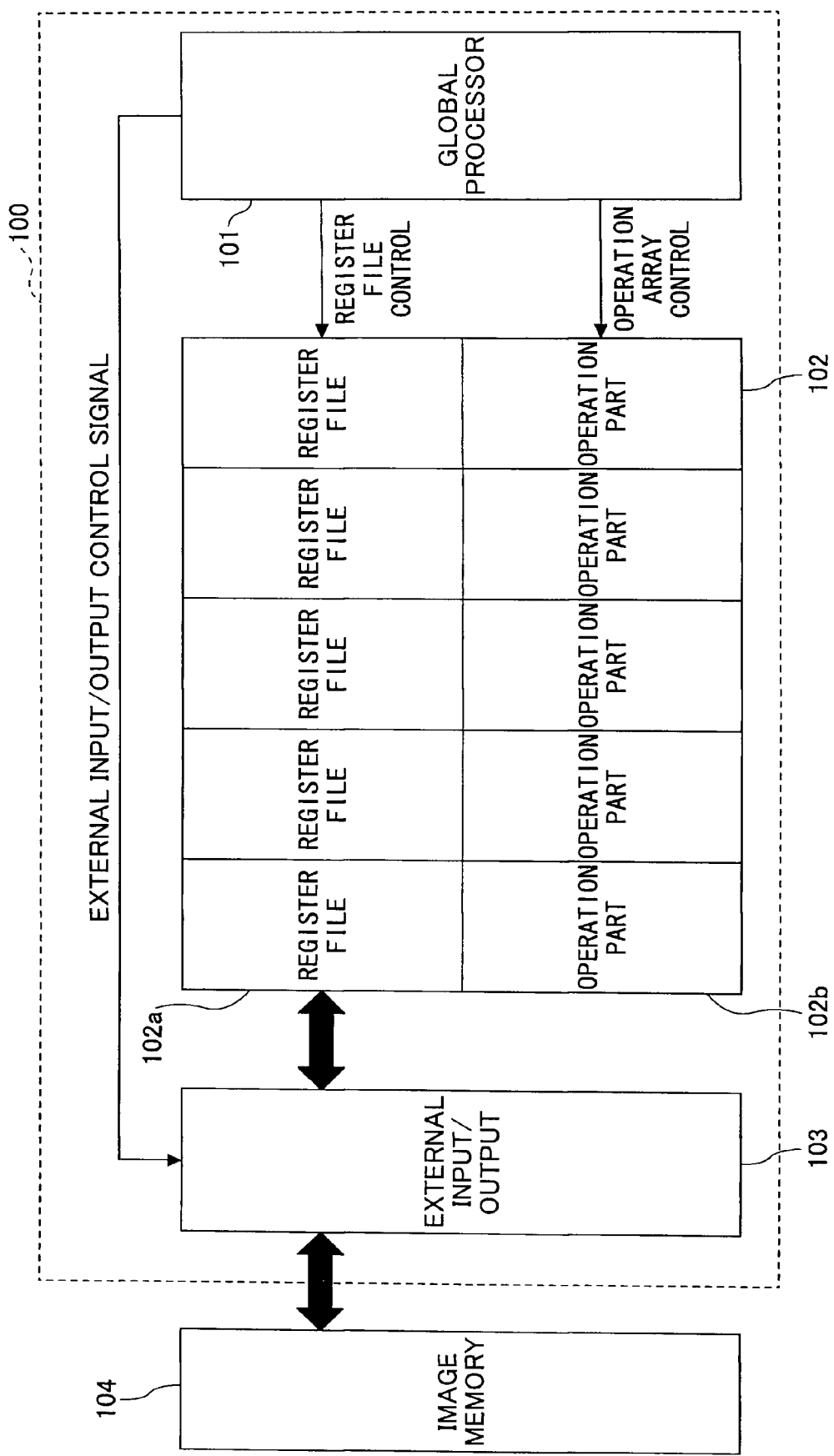
FIG. 1 is a block diagram of an SIMD-type microprocessor according to a related art.
Figure 2:
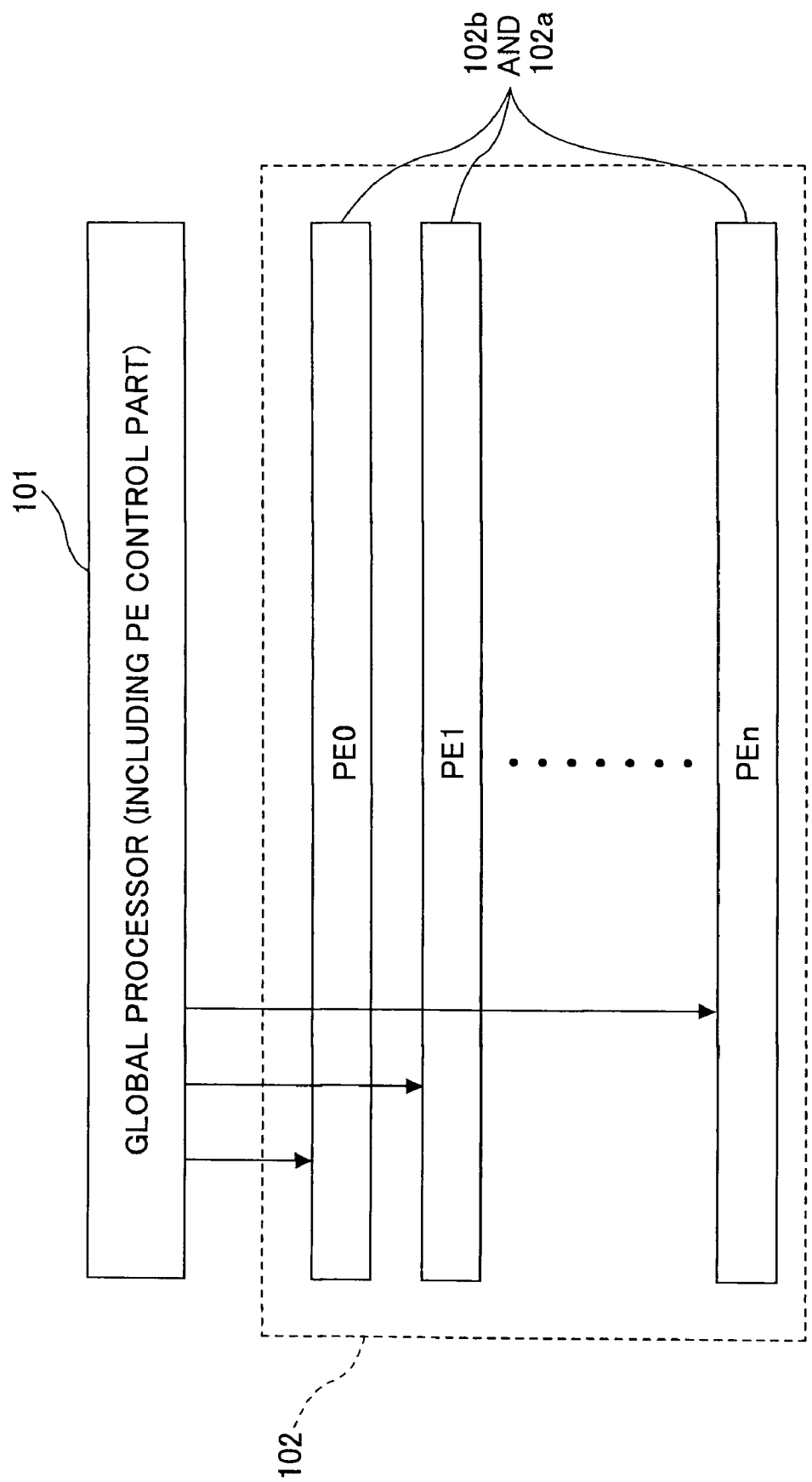
FIG. 2 is a diagram illustrating the difference between delay times due to the difference between the lengths of the control signal lines from a PE control signal generator according to a related art.

Next, some embodiments of the present invention will be described below.

One embodiment of the present invention relates to an SIMD (Single Instruction-stream, Multiple Data-stream)—type microprocessor in which plural data and the like are processed in parallel by one operation command.

It is an object of one embodiment of the present invention to provide an SIMD-type microprocessor with a comparatively small wiring delay of a control signal line from a processor element control signal generator for feeding a control signal to a processor element to an end terminal of a processor element group.

A first embodiment of the present invention is an SIMD-type microprocessor including a processor element group in which plural processor elements with an operation part and a register file are arranged and a processor element control signal generator configured to output a processor element control signal for controlling an operation of the processor element, wherein a feed part configured to feed a processor element control signal output from the processor element control signal generator to each processor element is provided at a center of the processor element group.

According to the first embodiment of the present invention, it may be possible to make a wiring delay from a processor element control signal generator to both terminals of a processor element group be smaller than that of a conventional configuration, because a processor element control signal output from the processor element control signal generator is fed from the feed part provided at a center of the processor element group to each processor element. Accordingly, if the number of a processor element(s) is a same number, it may be possible to improve an operation frequency of an SIMD-type microprocessor, and even though the number of a processor element(s) is increased, it may be possible to maintain an operation frequency.

A second embodiment of the present invention is the SIMD-type microprocessor according to the first embodiment of the present invention, wherein the processor element control signal generator includes the feed part.

According to the second embodiment of the present invention, a processor element control signal generator is arranged at a center of a processor element group and it may be possible to make a wiring delay from a processor element control signal generator to a most terminal processor element of a processor element group be as small as half of that of a conventional configuration, because the processor element control signal generator includes the feed part arranged at the center of the processor element group. Accordingly, if the number of a processor element(s) is a same number, it may be possible to improve an operation frequency of an SIMD-type microprocessor, and even though the number of a processor element(s) is increased, it may be possible to maintain an operation frequency.

A third embodiment of the present invention is the SIMD-type microprocessor according to the first or second embodiment of the present invention, which includes a global processor configured to control an entire of the SIMD-type microprocessor.

According to the third embodiment of the present invention, it may be possible to make a wiring delay from a processor element control signal generator to a most terminal processor element of a processor element group, in an SIMD-type microprocessor including a global processor, be as small as half of that of a conventional configuration, because the global processor is included. Accordingly, if the number of a processor element(s) is a same number, it may be possible to improve an operation frequency of an SIMD-type microprocessor, and even though the number of a processor element(s) is increased, it may be possible to maintain an operation frequency.

A fourth embodiment of the present invention is the SIMD-type microprocessor according to the third embodiment of the present invention, wherein the global processor includes the processor element control signal generator.

According to the fourth embodiment of the present invention, a global processor is arranged at a center of a processor element group and it may be possible to make a wiring delay from a processor element control signal generator to a most terminal processor element of a processor element group be as small as half of that of a conventional configuration, because the global processor includes the processor element control signal generator. Accordingly, if the number of a processor element(s) is a same number, it may be possible to improve an operation frequency of an SIMD-type microprocessor, and even though the number of a processor element(s) is increased, it may be possible to maintain an operation frequency.

A fifth embodiment of the present invention is the SIMD-type microprocessor according to any one of the first to fourth embodiments, wherein the processor element control signal generator is arranged adjacent to the plural processor elements and the feed part includes a buffer circuit configured to buffer the processor element control signal.

According to the fifth embodiment of the present invention, it may be possible to make a distance between processor elements partitioned by a central part of a processor element group be as small as possible whereby an operation with an adjacent processor element is allowed and it may be possible to improve a processing rate of a SIMD-type microprocessor, because the processor element control signal generator is arranged adjacent to the plural processor elements and the feed part includes a buffer circuit configured to buffer the processor element control signal.

A sixth embodiment of the present invention is the SIMD-type microprocessor according to the fifth embodiment of the present invention, wherein the feed part includes a pipeline register configured to output a processor element control signal.

According to the sixth embodiment of the present invention, it may be possible to output a processor element control signal from a buffer circuit directly behind a pipeline register to each processor element whereby a starting point of a pipeline approaches to each processor element and a wiring delay becomes smaller, and accordingly it may be possible to improve an operation frequency of an SIMD-type microprocessor, because the feed part includes a pipeline register configured to output a processor element control signal.

A seventh embodiment of the present invention is the SIMD-type microprocessor according to the fifth or sixth embodiment of the present invention, wherein the feed part includes a circuit configured to decode a signal from the processor element control signal generator.

According to the seventh embodiment of the present invention, it may be possible to use an encoded signal for a processor element control signal generator, because the feed part includes a circuit configured to decode a signal from the processor element control signal generator. Accordingly, it may be possible to reduce the number of a wire(s) for a control line between a processor element control signal generator and a feed part. Therefore, if a height of a feed part is determined depending on the number of a wire(s) for a control line(s), it may be possible to reduce the height. Accordingly, because it may also be possible to reduce a distance for partition of a processor element group, it may be possible to conduct a high-speed operation with data from an adjacent processor element and it may be possible to improve a processing rate of a SIMD-type microprocessor.

Next, some specific examples of the present invention will be described with reference to the accompanying drawings.

First Specific Example

Figure 3:
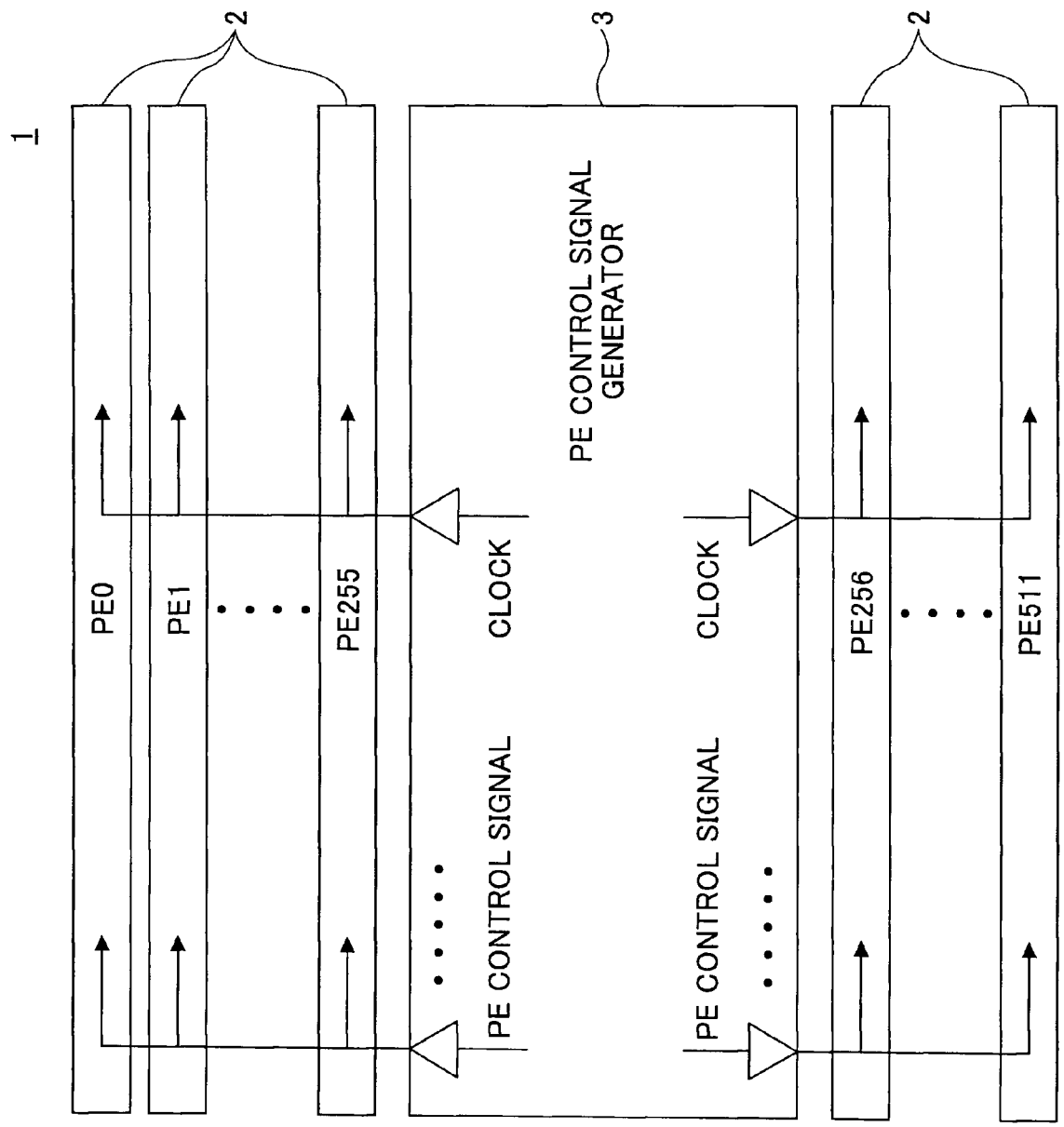
FIG. 3 is a block diagram of an SIMD-type microprocessor according to a first specific example of the present invention.
Figure 4:
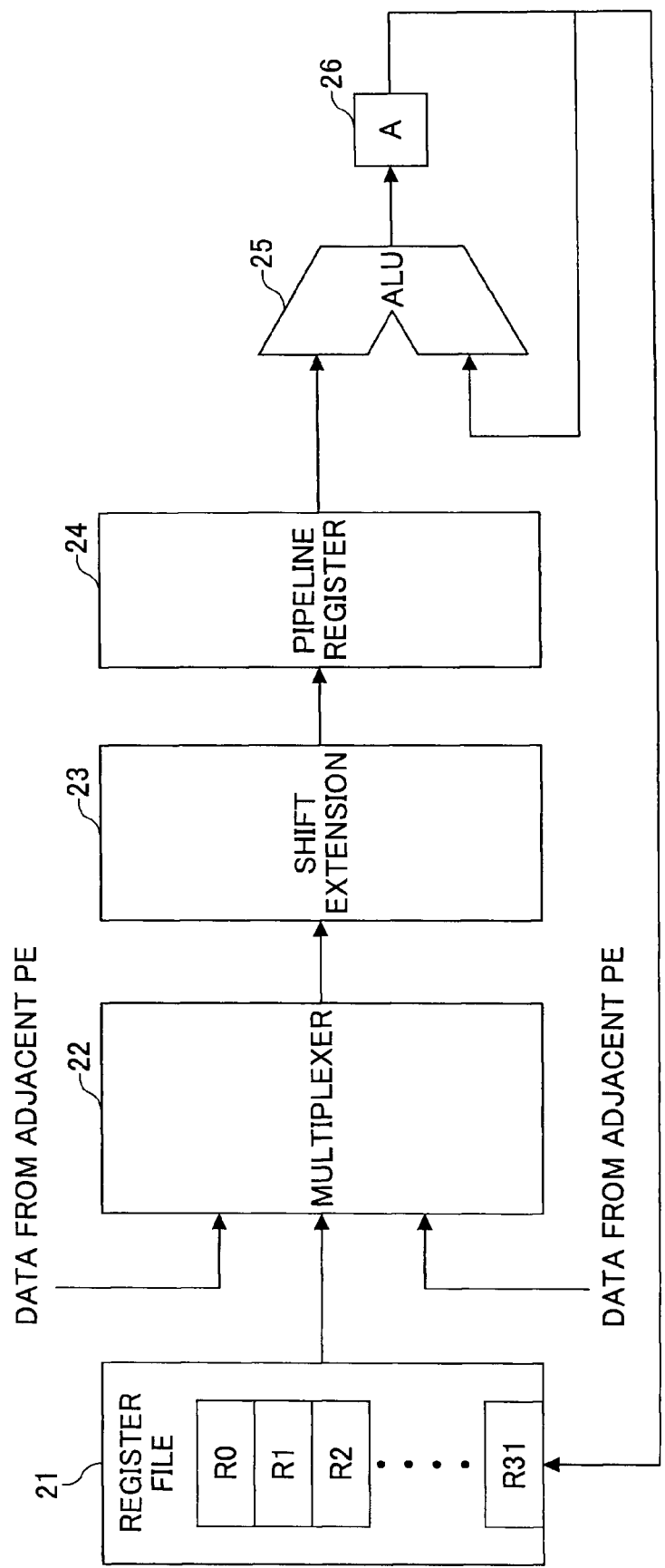
FIG. 4 is a block diagram of processor elements of the SIMD-type microprocessor illustrated in FIG. 3.

A first specific example of the present invention will be described with reference to FIG. 3 and FIG. 4 below. FIG. 3 is a block diagram of an SIMD-type microprocessor according to the first specific example of the present invention. FIG. 4 is a block diagram of processor elements of the SIMD-type microprocessor illustrated in FIG. 3.

An SIMD-type microprocessor illustrated in FIG. 3 includes plural processor elements 2 and a PE control signal generator 3. FIG. 3 depicts a portion of the SIMD-type microprocessor illustrated in FIG. 1, particularly centered at a processor element group. Therefore, a global processor, an input/output control, and the like are not illustrated in the figure but are also included.

As illustrated in FIG. 3, 512 processor elements 2, namely, PE0 to PE511, are arranged linearly. That is, the PE0 to PE511 correspond to a processor element group. Furthermore, a PE control signal generator (processor element control signal generator) 3 as a feed part for outputting a PE control signal to each processor element is arranged between 256 processor elements PE0 to PE255 and 256 other processor elements PE256 to PE511 of the processor element group. In other words, the PE control signal generator 3 partitions the processor element group, between PE255 and PE256, that is, at the central part (center part), and, PE0 and PE255 are arranged at the upper farthest position and upper nearest position, respectively, and PE256 and PES11 are arranged at the lower nearest position and the lower farthest position, respectively, when viewing from the PE control signal generator of FIG. 3. Thus, the feed part for feeding the processor element control signal output from the processor element control signal generator to each processor element is provided centered on the processor element group.

FIG. 4 illustrates the structure of a processor element 2. The processor element 2 includes a register file 21, a multiplexer 22, a shift extension 23, a pipeline register 24, an ALU 25, and an AL register 26, wherein data stored in the register file 21 are operated according to a PE control signal input from a PE control signal generator 3.

The register file 21 includes 32 registers of 32 bits, and outputs data stored in the registers to the multiplexer 22 described below according to a PE control signal or stores the contents of an A register described below.

The multiplexer 22 selects and outputs data input from the register file 21. The multiplexer 22 is provided to allow that data of a register file 21 of PEn−1 or PEn+1 adjacent to PEn are dealt similarly to data of a register file 21 of PEn when the data of the register file 21 of PEn and the data of the register file 21 of adjacent PEn−1 or PEn+1 are operated by means of an operation used in an image processing system or the like, and thus it is possible to execute an operation by one command while using an ALU 25 of PEn.

The shift extension 23 applies a bit shift and a zero or sign extension to data having passed through the multiplexer 22.

The pipeline register 24 is a register provided to separate the stages of the processing to the shift extension 23, processing of the ALU 25, and pipeline processing.

The ALU 25 is an arithmetic and logic unit which applies an operation specified by a PE control signal to data input from the pipeline register 24 and data of the A register 26 as an input and makes an output to the A register 26.

The A register 26 is an accumulator for storing the result of the operation on the ALU 25. Then, an operation part is composed of the multiplexer 22, the shift extension 23, the pipeline register 24, the ALU 25, and the A register 26.

The PE control signal generator 3 is a circuit for generating a signal for controlling the processor elements 2 described above, generates a PE control signal in response to execution of a program on a global processor that is not shown in the figure and outputs it to each processor element 2. The PE control signal output from the PE control signal generator 3 indicates a control signal such as an operation selection signal of the ALU 25 in the processor element 2, a writing signal for the pipeline register, the register file 21 for data storage, or the like, and further, a clock signal in FIG. 3 may also be included in the PE control signal.

For example, the PE control signal generator 3 outputs an effective PE control signal at each stage according to an operation command requiring 3 stages for the processing in the processor element 2. At the stage for reading from the register file 21 and conducting a shift extension processing, the address of the register file 21 and a reading signal, a selection signal of the multiplexer 22 for an adjacent processor element 2, a shift signal, an extension signal, a writing signal for the pipeline register 24 in front of the ALU 25, and the like are output. At the stage for conducting an operation at the ALU 25, a signal for selecting an operation of the ALU 25 such as addition or subtraction operation, a writing signal for the A register 26 which is an accumulator, and the like, are output. At the stage of writing of the register file 21, the address of the register file 21, a writing signal, and the like are output.

In the SIMD-type microprocessor 1 with the above-mentioned configuration, it may be possible to make the difference between the wiring delay of a PE control signal to a processor element 2 nearest the PE control signal generator 3, i.e. PE255 or PE256, and the wiring delay of a PE control signal to a processor element 2 farthest from the PE control signal generator 3, i.e. PE0 or PES11, be about half compared to that of a SIMD-type microprocessor 100 according to a related art in which the PE control signal generator 101 is arranged at one end of the processor element group as illustrated in FIG. 1.

According to the present specific example, the PE control signal generator 3 is arranged between PE 255 and PE256 at the center of the processor element group in which 512 processor elements are arranged linearly and it may be possible to make the difference from the wiring delay of a PE control signal to a processor element 2 farthest from the PE control signal generator 3, i.e., PE0 or PE511, be about half of a conventional one, whereby if the number of the processor elements is the same number it may be possible to improve the operation frequency of the SIMD-type microprocessor 1 and even though the number of the processor elements is increased, it may be possible to maintain the operation frequency.

Second Specific Example

Figure 5:
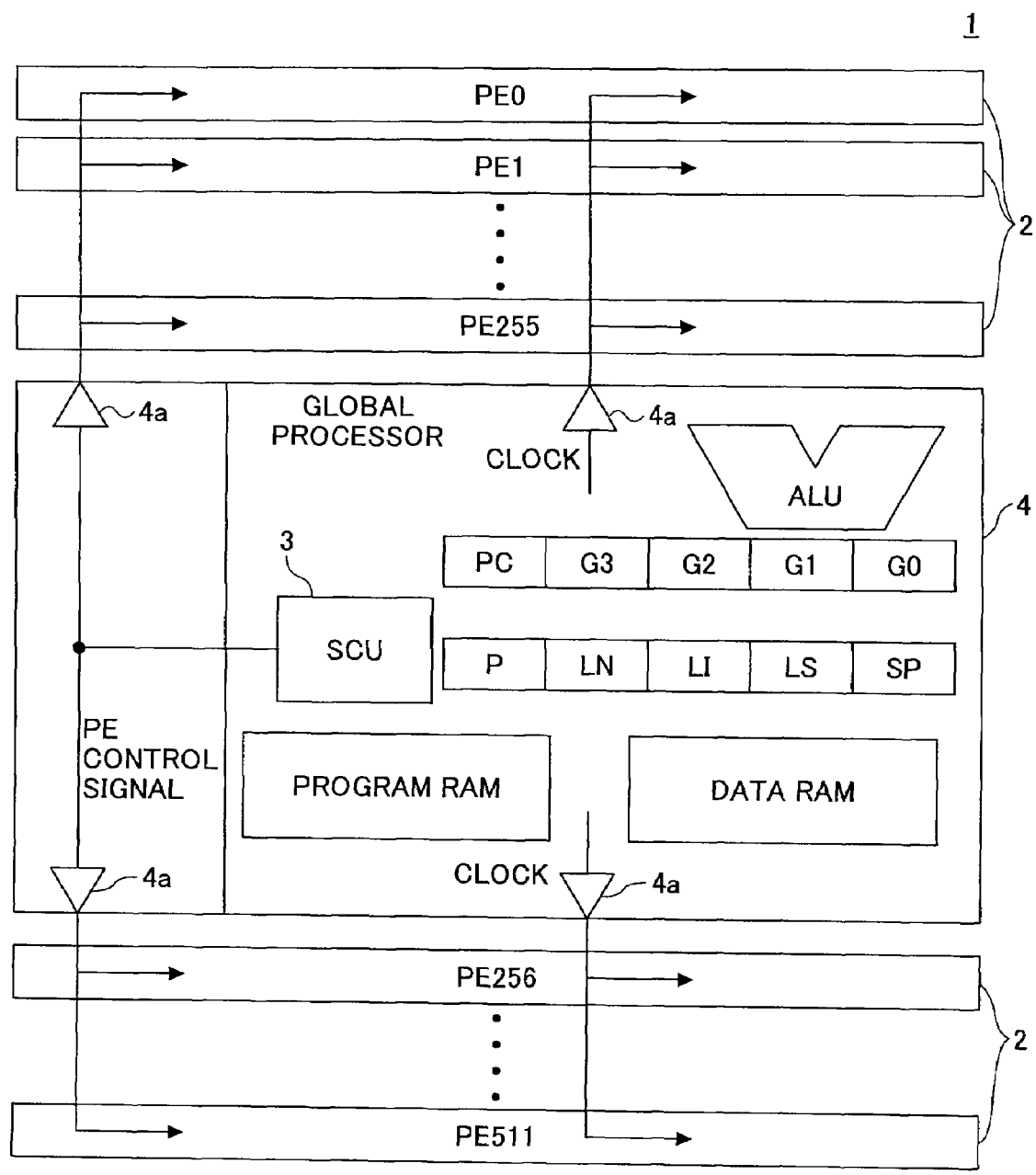
FIG. 5 is a block diagram of an SIMD-type microprocessor according to a second specific example of the present invention.

Next, a second specific example of the present invention will be described with reference to FIG. 5. Additionally, the parts identical to those of the above-mentioned first specific example will be labeled with the identical reference numerals and their descriptions will be omitted. FIG. 5 is a block diagram of an SIMD-type microprocessor 1 according to the second specific example of the present invention.

The present specific example is different from the first specific example in that a PE control signal generator 3 is included in a global processor 4 (feed part) and the global processor 4 is arranged at the center of a processor element group.

As illustrated in FIG. 5, the global processor 4 includes a program counter PC for holding the address of a program to be executed, a program RAM for sorting the program to be executed on the global processor, a data Ram for operation data storage, registers G0-G3 which are generalized registers for processing operation data storage, an ALU for the global processor, a stack pointer SP for holding the address of a data RAM for saving at the time of register saving or resetting, a link register LS for holding a calling address at the time of a sub-routine call, registers LI and LN for holding branching addresses at the time of interruption and at the time of NMI (non-maskable interruption), a processor status register P for holding the status of a processor, and a sequence unit SCU for interpreting a command and generating various kinds of control signals.

Then, the global processor 4 executes a GP (global processor) command and a PE (processor element) command using the above-mentioned register, memory, ALU, and the like. At the time of executing a PE command, a PE control signal generated by a PE control signal generator included in the SCU is fed to each processor element via a buffer circuit 5*a*.

In the SIMD-type microprocessor 1 with the above-mentioned configuration, it may be possible to make the difference between the wiring delay of a PE control signal to a processor element 2 nearest the global processor 4, i.e. PE255 or PE256, and the wiring delay of a PE control signal to a processor element 2 farthest from the global processor 4, i.e. PE0 or PE511, be about half compared to that of a SIMD-type microprocessor 100 according to a related art in which the global processor 101 is arranged at one end of the processor element group as illustrated in FIG. 1.

According to the present specific example, the global processor 4 is arranged between PE 255 and PE256 at the center of the processor element group in which 512 processor elements are arranged linearly and it may be possible to make the difference from the wiring delay of a PE control signal to a processor element 2 farthest from the global processor, i.e., PE0 or PE511, be about half of a conventional one, whereby if the number of the processor elements is the same number it may be possible to improve the operation frequency of the SIMD-type microprocessor 1 and even though the number of the processor elements is increased, it may be possible to maintain the operation frequency.

Third Specific Example

Figure 6:
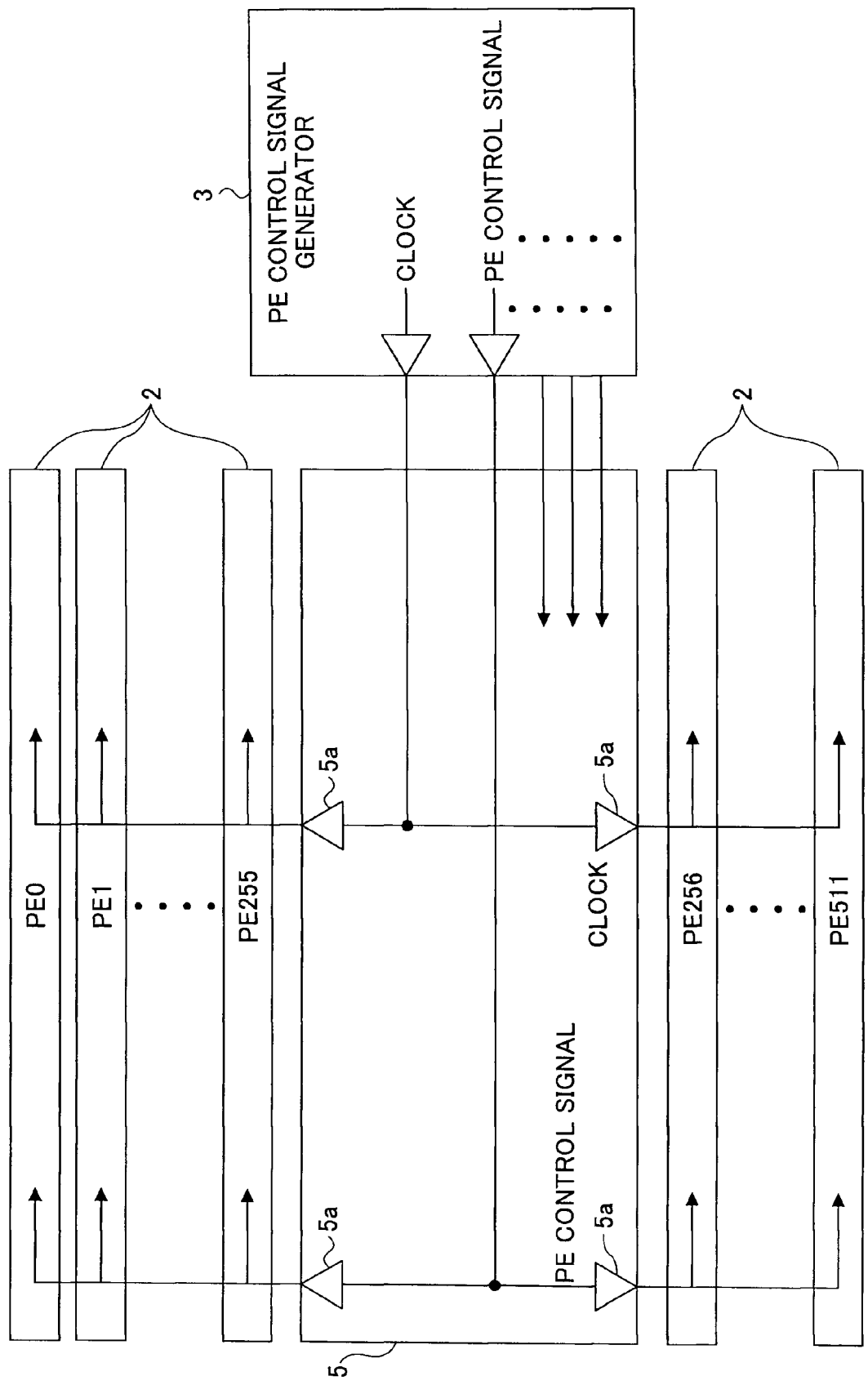
FIG. 6 is a block diagram of an SIMD-type microprocessor according to a third specific example of the present invention.

Next, a third specific example of the present invention will be described with reference to FIG. 6. Additionally, the parts identical to those of the above-mentioned first or second specific example will be labeled with the identical reference numerals and their descriptions will be omitted. FIG. 6 is a block diagram of a SIMD-type microprocessor 1 according to the third specific example of the present invention.

In the present specific example, only a buffer circuit 5*a* for outputting a PE control signal is arranged at a central part 5 (for example, between PE255 and PE256) as a feed part of a processor element group. A PE control signal generator 3 is different from the first and second specific examples in the configuration of its arrangement adjacent to the processor element group.

Thus, it may be possible to make the distance between PE255 and PE256 partitioned at the center of the processor element group be as small as possible.

According to the present specific example, it may be possible to the distance between PE 255 and PE256 partitioned at the center be as small as possible, because only the buffer circuit 5*a* for outputting a PE control signal is arranged at the central part 5 of the processor element group, and therefore, it may be possible to conduct operations of PE255 and PE256 provided near the central part 5 and the like as if they are adjacent processor elements 2, similarly to the other processor elements 2.

Fourth Specific Example

Figure 7:
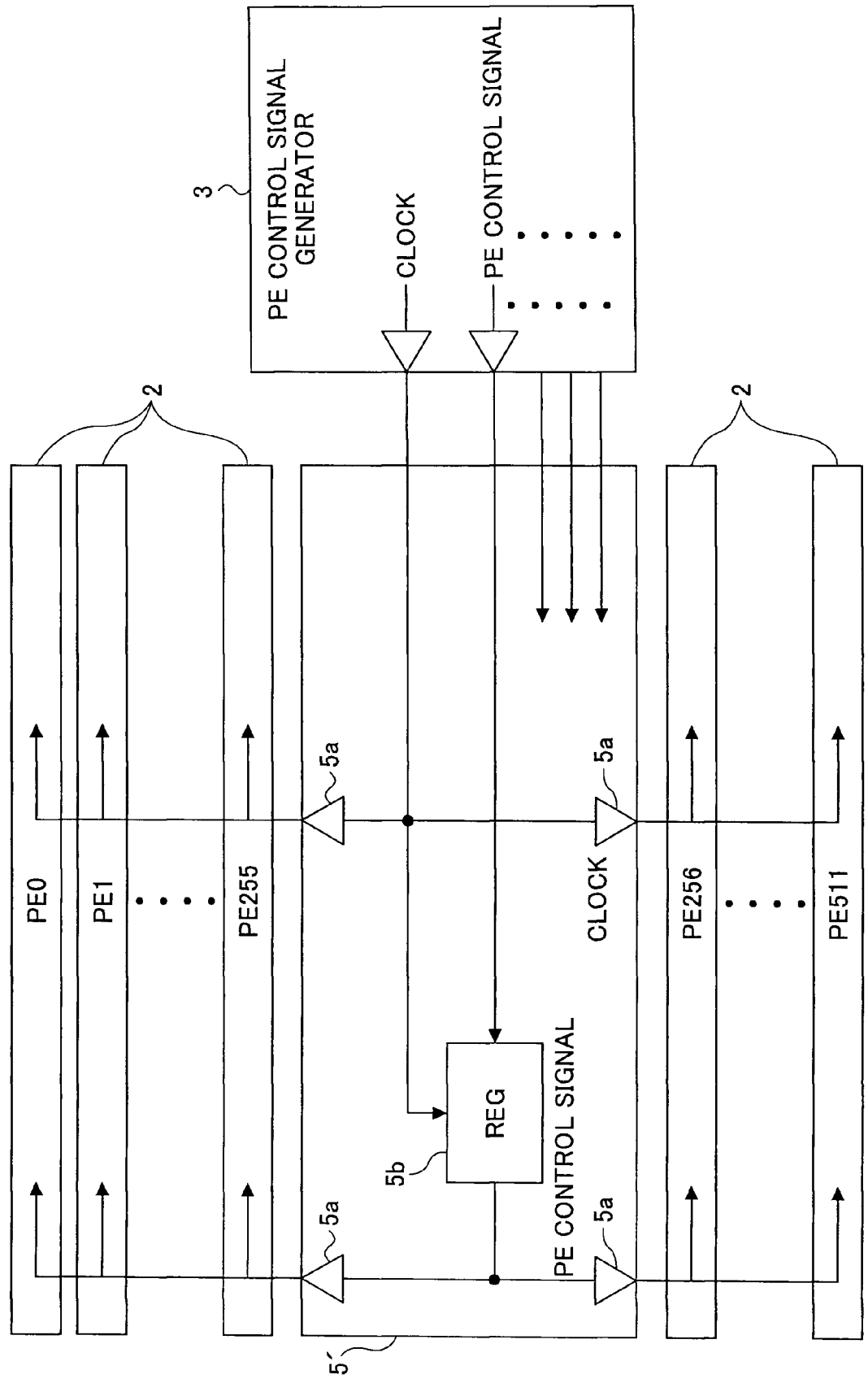
FIG. 7 is a block diagram of an SIMD-type microprocessor according to a fourth specific example of the present invention.

Next, a fourth specific example of the present invention will be described with reference to FIG. 7. Additionally, the parts identical to those of the above-mentioned first to three specific examples will be labeled with the identical numeral references and their descriptions will be omitted. FIG. 7 is a block diagram of a SIMD-type microprocessor 1 according to the fourth specific example of the preset invention.

The present specific example is different from the third specific example in that a pipeline register 5*b* is arranged in front of a buffer circuit 5*a* for buffering a PE control signal for each processor element at a central part 5' as a feed part of a processor element group.

Whereas the pipeline for outputting a PE control signal starts from the inside of the PE control signal generator in the third specific example, the pipeline register 5*b* for outputting a PE control signal is arranged at the central part 5' in the present specific example, whereby the starting point of a pipeline is provided at the central part. Because the distance from the central part 5' to each processor element is smaller than that from the PE control signal generator 3, the wiring delay is smaller accordingly and it may be possible to further improve the operation frequency.

According to the present specific example, the buffer circuit 5*a* for outputting a PE control signal and a pipeline register 5*b* are arranged at the center part 5' of the processor element group and in front of the buffer circuit 5*a*, respectively, and therefore, the starting point of a pipeline approaches to each processor element 2 and the wiring delay becomes smaller whereby it may be possible to improve the operation frequency of the SIMD-type microprocessor 1.

Fifth Specific Example

Next, a fifth specific example of the present invention will be described with reference to FIG. 8. Additionally, the parts identical to those of the above-mentioned first to fourth specific examples will be labeled with the identical numeral references and their descriptions will be omitted. FIG. 8 is a block diagram of a SIMD-type microprocessor 1 according to the fifth specific example of the preset invention.

The present specific example is different from the fourth specific example in the configuration such that a pipeline register 5b is arranged in front of a buffer circuit 5a for buffering a PE control signal for each processor element at a central part 5" as a feed part of a processor element group and further a decoder circuit (decoding circuit) 5c is added.

The decoder circuit 5c has a function of decoding a PE control signal which is transmitted from a PE control signal generator 3 to the central part 5".

According to the present specific example, it may be possible to transmit an encoded control signal from the PE control signal generator 3 to the central part 5" due to the decoder circuit 5c and it may be possible to reduce the number of a wire(s), because the buffer circuit 5a for outputting a PE control signal and the pipeline register 5b are arranged at the central part 5" of the processor element group and in front of the buffer circuit 5a, respectively, and further the decoder circuit 5c is added. Furthermore, when the height of the central part 5" is determined depending on the number of a wire(s) for a PE control line(s), the number of the wire(s) is reduced and therefore it may be possible to reduce the height. Accordingly, the distance between partitioned PE255 and PE256 is further reduced and it may be possible to conduct a high speed operation with an adjacent processor element 2.

Additionally, the linear arrangement of the processor elements 2 has been illustrated in each of the above-mentioned specific examples but is not necessitated. Even though their plural sequence arrangement is provided, a PE control signal is fed from the center of a processor element group having the plural sequences, whereby it may be possible to reduce the number of a wire(s) compared to the case of feeding from one end of the processor element group.

Although the embodiments and specific examples of the present invention have been described above with reference to the accompanying drawings, the present invention is not limited to any of the embodiments and specific examples and the embodiments and specific examples may be altered or modified without departing from the scope of the present invention.

The present application claims the benefit of the priority based on Japanese Patent application No. 2008-011187 filed on Jan. 22, 2008 in Japan, the entire contents of which are hereby incorporated by reference.

What is claimed is:

1. A SIMD-type microprocessor comprising:
a processor element group including plural processor elements, each of the processor elements having an operation part and a register file arranged in the processor element;
a processor element control signal generator configured to output a clock signal and a processor element control signal controlling operation of the processor elements; and
a feed part disposed at a center of the processor element group and configured to feed the processor element control signal output from the processor element control signal generator to each of the processor elements in the processor element group,
wherein the feed part includes a first buffer circuit and a pipeline register configured as a pipeline starting point at the center of the processor element group to register, in accordance with the clock signal, the processor element control signal from the processor element control signal generator and output the registered processor element control signal to the first buffer circuit, and the first buffer circuit buffers the registered processor element control signal and outputs the buffered processor element control signal to said each of the processor elements in the processor element group.

2. The SIMD-type microprocessor as claimed in claim 1, wherein the processor element control signal generator comprises the feed part.

3. The SIMD-type microprocessor as claimed in claim 1, further comprising a global processor configured to control an entire of the SIMD-type microprocessor.

4. The SIMD-type microprocessor as claimed in claim 3, wherein the global processor comprises the processor element control signal generator.

5. The SIMD-type microprocessor as claimed in claim 1, wherein the processor element control signal generator is arranged adjacent to the plural processor elements and the first buffer circuit is configured to buffer the processor element control signal from the pipeline register.

6. The SIMD-type microprocessor as claimed in claim 5, wherein the feed part comprises a circuit configured to decode a signal from the processor element control signal generator.

7. A method of processing data, comprising a step of processing data by using the SIMD-type microprocessor as claimed in claim 1.

8. An image data processing system, comprising:
the SIMD-type microprocessor as claimed in claim 1 and
an image memory storing image data.

9. A method of processing image data, comprising:
a step of reading image data from an image memory; and
a step of processing the image data by using a SIMD-type microprocessor comprising:
a processor element group including plural processor elements, each of the processor elements having an operation part and a register file arranged in the processor element;
a processor element control signal generator configured to output a clock signal and a processor element control signal controlling operation of the processor elements; and
a feed part disposed at a center of the processor element group and configured to feed the processor element control signal output from the processor element control signal generator to each of the processor elements in the processor element group,
wherein the feed part includes a first buffer circuit and a pipeline register configured as a pipeline starting point at the center of the processor element group to register, in accordance with the clock signal, the processor element control signal from the processor element control signal generator and output the registered processor element control signal to the first buffer circuit, and the first buffer circuit buffers the registered processor element control signal and outputs the buffered processor element control signal to said each of the processor elements in the processor element group.

10. A SIMD-type microprocessor comprising:

a processor element group including plural processor elements, each of the processor elements having an operation part and a register file arranged in the processor element;

a processor element control signal generator configured to output a clock signal and a processor element control signal controlling operation of the processor elements; and a feed part disposed at a center of the processor element group and configured to feed the processor element control signal output from the processor element control signal generator to each of the processor elements in the processor element group, wherein the feed part includes a first buffer circuit and a pipeline register configured as a pipeline starting point at the center of the processor element group to register, in accordance with the clock signal, the processor element control signal from the processor element control signal generator and output the registered processor element control signal to the first buffer circuit, and the first buffer circuit buffers the registered processor element control signal and outputs the buffered processor element control signal to said each of the processor elements in the processor element group, wherein the feed part further comprises a second buffer circuit, the pipeline register output the processor element control signal additionally to the second buffer circuit, the first buffer circuit buffers the processor element control signal from the pipeline register and outputs the buffered processor element control signal to first plural processor elements in a first partition of the processor element group, and the second buffer circuit buffers the processor element control signal from the pipeline register and outputs the buffered processor element control signal to second plural processor elements in a second partition of the processor element group, said second plural processor elements not overlapping with said first plural processor elements.

* * * * *

UNITED STATES PATENT AND TRADEMARK OFFICE
CERTIFICATE OF CORRECTION

PATENT NO.         : 8,024,550 B2
APPLICATION NO.    : 12/356676
DATED              : September 20, 2011
INVENTOR(S)        : Hidehito Kitamura It is certified that error appears in the above-identified patent and that said Letters Patent is hereby corrected as shown below:

Title Page item 30

Insert the Foreign Application Priority Data section on the cover page of the patent, containing the following:

-- January 22, 2008  (JP) ...... JP2008-011187 --

Signed and Sealed this
Fifteenth Day of November, 2011

David J. Kappos
*Director of the United States Patent and Trademark Office*